US009395864B2

(12) United States Patent
Leong et al.

(10) Patent No.: US 9,395,864 B2
(45) Date of Patent: Jul. 19, 2016

(54) ANIMATION FOR EXPANDING/COLLAPSING CONTENT AND FOR SORTING CONTENT IN AN ELECTRONIC DOCUMENT

(75) Inventors: Josh Leong, Seattle, WA (US); Christopher D. Edwards, Seattle, WA (US); Karen Xiaoxu Cheng, Redmond, WA (US); Chad B. Rothschiller, Edmonds, WA (US); Clinton Dee Covington, Redmond, WA (US); Krista Anne Bendig, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 763 days.

(21) Appl. No.: 13/293,968

(22) Filed: Nov. 10, 2011

(65) Prior Publication Data
US 2013/0055123 A1  Feb. 28, 2013

Related U.S. Application Data

(63) Continuation of application No. 13/222,914, filed on Aug. 31, 2011.

(51) Int. Cl.
*G06F 3/048* (2013.01)

(52) U.S. Cl.
CPC ..................................... *G06F 3/048* (2013.01)

(58) Field of Classification Search
None
See application file for complete search history.

(56) References Cited

U.S. PATENT DOCUMENTS

| 7,412,389 | B2 | 8/2008 | Yang |
| 7,432,928 | B2* | 10/2008 | Shaw et al. .................... 345/473 |
| 7,441,207 | B2 | 10/2008 | Filner et al. |
| 7,610,564 | B1 | 10/2009 | Pfohe et al. |
| 2006/0024763 | A1* | 2/2006 | Schmidt ............. G01N 33/6848 435/7.5 |
| 2006/0129914 | A1* | 6/2006 | Ellis et al. ...................... 715/504 |
| 2006/0265413 | A1* | 11/2006 | Blencowe ......... G06F 17/30991 |
| 2007/0050697 | A1 | 3/2007 | Lewis-Bowen et al. |
| 2007/0057951 | A1* | 3/2007 | Anthony et al. ............... 345/473 |
| 2007/0270985 | A1* | 11/2007 | Shellshear ....................... 700/87 |
| 2008/0086359 | A1* | 4/2008 | Holton ............... G06Q 30/0201 705/7.29 |

(Continued)

OTHER PUBLICATIONS

Morrison, Scott, "Sorting Data in the Silverlight DataGrid," Published Jun. 10, 2008, Retrieved Jun. 7, 2011, http://blogs.msdn.com/b/scmorris/archive/2008/06/10/sorting-data-in-the-silverlight-datagrid.aspx, 4 pages.

(Continued)

*Primary Examiner* — Hien Duong
(74) *Attorney, Agent, or Firm* — Julie Kane Akhter; Tom Wong; Micky Minhas

(57) ABSTRACT

Animation for the expansion and collapse of content in a user interface may be provided. The user interface may be displayed by a computer and may contain a content surface for editing content. The content may include a top data row and data items in rows below the top data row on the content surface. The computer may then receive an input to expand/collapse the data items into the top data row. The computer may then animate a display of the data items expanding/collapsing into the top data row. Animation for the sorting of content in a user interface may also be provided. The user interface may be displayed by a computer and may contain a content surface for editing a plurality of rows containing content. The computer may then receive a request to sort the content. The computer may then animate a sort of the content.

13 Claims, 13 Drawing Sheets

(56) References Cited

U.S. PATENT DOCUMENTS

| | | | |
|---|---|---|---|
| 2008/0180408 A1* | 7/2008 | Forstall et al. | 345/177 |
| 2008/0256467 A1 | 10/2008 | Chu et al. | |
| 2009/0106310 A1 | 4/2009 | Lanza et al. | |
| 2009/0187864 A1 | 7/2009 | Bedell et al. | |
| 2009/0259975 A1 | 10/2009 | Asai | |
| 2009/0307188 A1 | 12/2009 | Oldham et al. | |
| 2009/0319882 A1* | 12/2009 | Morrison | G06F 17/245 715/227 |
| 2010/0175023 A1 | 7/2010 | Gatlin et al. | |
| 2010/0241955 A1 | 9/2010 | Price et al. | |
| 2010/0333039 A1 | 12/2010 | Denkel | |
| 2011/0126155 A1 | 5/2011 | Krishnaraj et al. | |
| 2011/0163968 A1* | 7/2011 | Hogan | 345/173 |
| 2011/0173538 A1 | 7/2011 | Robert et al. | |
| 2012/0053978 A1 | 3/2012 | Andersen et al. | |
| 2013/0055167 A1 | 2/2013 | Leong et al. | |

OTHER PUBLICATIONS

ShowSim, "Official Release of ShowSim 4.0," Apr. 8, 2010, Retrieved Jun. 7, 2011, http://www.showsim.com/NewsDetails.aspx?NewsID=2, 2 pages.

U.S. Office Action mailed Jan. 31, 2013 in U.S. Appl. No. 13/222,914, 15 pages.

U.S. Office Action mailed Jun. 12, 2013 in U.S. Appl. No. 13/222,914, 15 pages.

Expand animation, Collapse animation—r.a.d.panelbar, published Sep. 12, 2009 by Telerik. Internet Wayback archive. 1 pg. (cited in Jul. 16, 2014 OA).

Telerik; Tree View / Expand Animation by Telerik, Feb. 2011. Internet Wayback archive downloaded at http://web.archive.org/web/20110227141012/http://demos.telerik.com/aspnetajax/treeview/examples/functionality/expandanimation/defaultcs.aspx. 3 pages (cited in Jul. 1, 2015 OA).

Telerik; Tree View for ASP.NET AJAX, by Telerik, Feb. 2011, 7 pages. Internet Wayback archive downloaded at http://web.archive.org/web/20110220002544/http://www.telerik.com/products/aspnet-ajax/treeview.aspx. (cited in Jul. 1, 2015 OA).

U.S. Office Action mailed Feb. 14, 2014 in U.S. Appl. No. 13/222,914, 14 pages.

U.S. Office Action mailed Jul. 16, 2014 in U.S. Appl. No. 13/222,914, 12 pages.

U.S. Office Action mailed Jul. 1, 2015 in U.S. Appl. No. 13/222,914, 12 pages.

U.S. Office Action mailed Dec. 3, 2015 in U.S. Appl. No. 13/222,914, 23 pgs.

Animated Collapsible Div Version 2.4 by Dynamic Drive. Internet wayback archive, Aug. 8, 2010, 7 pgs.

* cited by examiner

| | A | B | C | D | E | F | G | H | I |
|---|---|---|---|---|---|---|---|---|---|
| 1 | CILANTRO | THYME | OREGANO | BASIL | | | | | |
| 2 | 271 | 828 | 182 | 845 | | | | | |
| 3 | 271 | 828 | 182 | 845 | | | | | |
| 4 | 271 | 828 | 182 | 845 | | | | | |
| 5 | 271 | 828 | 182 | 845 | | | | | |
| 6 | 271 | 828 | 182 | 845 | | | | | |
| 7 | 775 | 724 | 709 | 369 | | | | | |
| 8 | 775 | 724 | 709 | 369 | | | | | |
| 9 | 775 | 724 | 709 | 369 | | | | | |
| 10 | 775 | 724 | 709 | 369 | | | | | |
| 11 | 775 | 724 | 709 | 369 | | | | | |
| 12 | 747 | 135 | 266 | 249 | | | | | |
| 13 | 747 | 135 | 266 | 249 | | | | | |
| 14 | 747 | 135 | 266 | 249 | | | | | |
| 15 | 747 | 135 | 266 | 249 | | | | | |
| 16 | 747 | 135 | 266 | 249 | | | | | |
| 17 | 747 | 135 | 266 | 249 | | | | | |
| 18 | 904 | 523 | 536 | 028 | | | | | |
| 19 | 904 | 523 | 536 | 028 | | | | | |
| 20 | 904 | 523 | 536 | 028 | | | | | |
| 21 | 904 | 523 | 536 | 028 | | | | | |
| 22 | 904 | 523 | 536 | 028 | | | | | |
| 23 | 904 | 523 | 536 | 028 | | | | | |
| 24 | 904 | 523 | 536 | 028 | | | | | |

SORT
- SMALL TO LARGE
- LARGE TO SMALL

FILTER
- ☐ 028
- ☐ 249
- ☐ 369
- ☐ 545

FIG. 7

MOBILE COMPUTING DEVICE

ANIMATION FOR EXPANDING/COLLAPSING CONTENT AND FOR SORTING CONTENT IN AN ELECTRONIC DOCUMENT

CROSS-REFERENCE TO RELATED APPLICATIONS

This application is a continuation of U.S. application Ser. No. 13/222,914, filed on Aug. 31, 2011, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computer application programs include functionality for utilizing user interface controls for expanding/collapsing data displayed in one or more columns or rows in an electronic document. Currently however, these computer application programs provide a limited user experience in displaying expand/collapse functionality. In particular, current functionality is limited to an initial display of content prior to being expanded/collapsed and a final display of content after having been expanded/collapsed. Furthermore, the transition from the initial to the final displays is currently instantaneous. As a result, in many instances it may not be apparent to users viewing such functionality when content is expanded or collapsed, which content items the user to action on to expand/collapsed and what was the result of the user action.

Many computer application programs also include functionality for the sorting of data in an electronic document. For example, a user may wish to sort items of numerical data in an ascending or descending order. Currently however, computer application programs provide a limited experience in displaying data sorting. In particular, current functionality is limited to an initial display of data prior to being sorted and a final display of the data after having been sorted. Furthermore, the transition from the initial to the final displays is currently instantaneous. That is, the display of the old sort order is instantly redrawn to the display of the new sort order by the computer application programs. As a result, in many instances it may not be immediately apparent to users viewing such functionality whether or not data has been sorted, the identification of a column (from among multiple columns of data) their data is being sorted on and the direction of the sort. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for animating the expansion and collapse of content in a user interface for an electronic document. The user interface may be displayed by a computer and may contain a content surface for editing content. The content may include a top data row and data items in rows below the top data row on the content surface. The computer may then receive an input to expand/collapse the data items into the top data row. The computer may then animate a display of the data items expanding/collapsing into the top data row.

Additional embodiments are provided for animating the sorting of content in a user interface for an electronic document. The user interface may be displayed by a computer and may contain a content surface for editing a plurality of rows containing content. The computer may then receive a request to sort the content. The computer may then animate a sort of the content.

These and other features and advantages will be apparent from a reading of the following detailed description and a review of the associated drawings. It is to be understood that both the foregoing general description and the following detailed description are illustrative only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 5 is a computer screen display of a user interface showing an initial stage of an animation of content being sorted, in accordance with an embodiment;

FIG. 6 is a computer screen display of a user interface showing an intermediate stage of an animation of content being sorted, in accordance with an embodiment;

FIG. 7 is a computer screen display of a user interface showing a final stage of an animation of content being sorted, in accordance with an embodiment;

DETAILED DESCRIPTION

Embodiments are provided for animating the expansion and collapse of content in a user interface for an electronic document. The user interface may be displayed by a computer and may contain a content surface for editing content. The content may include a top data row and data items in rows below the top data row on the content surface. The computer may then receive an input to expand/collapse the data items into the top data row. The computer may then animate a display of the data items expanding/collapsing into the top data row.

Additional embodiments are provided for animating the sorting of content in a user interface for an electronic document. The user interface may be displayed by a computer and may contain a content surface for editing a plurality of rows containing content. The computer may then receive a request to sort the content. The computer may then animate a sort of the content.

Figure 1:
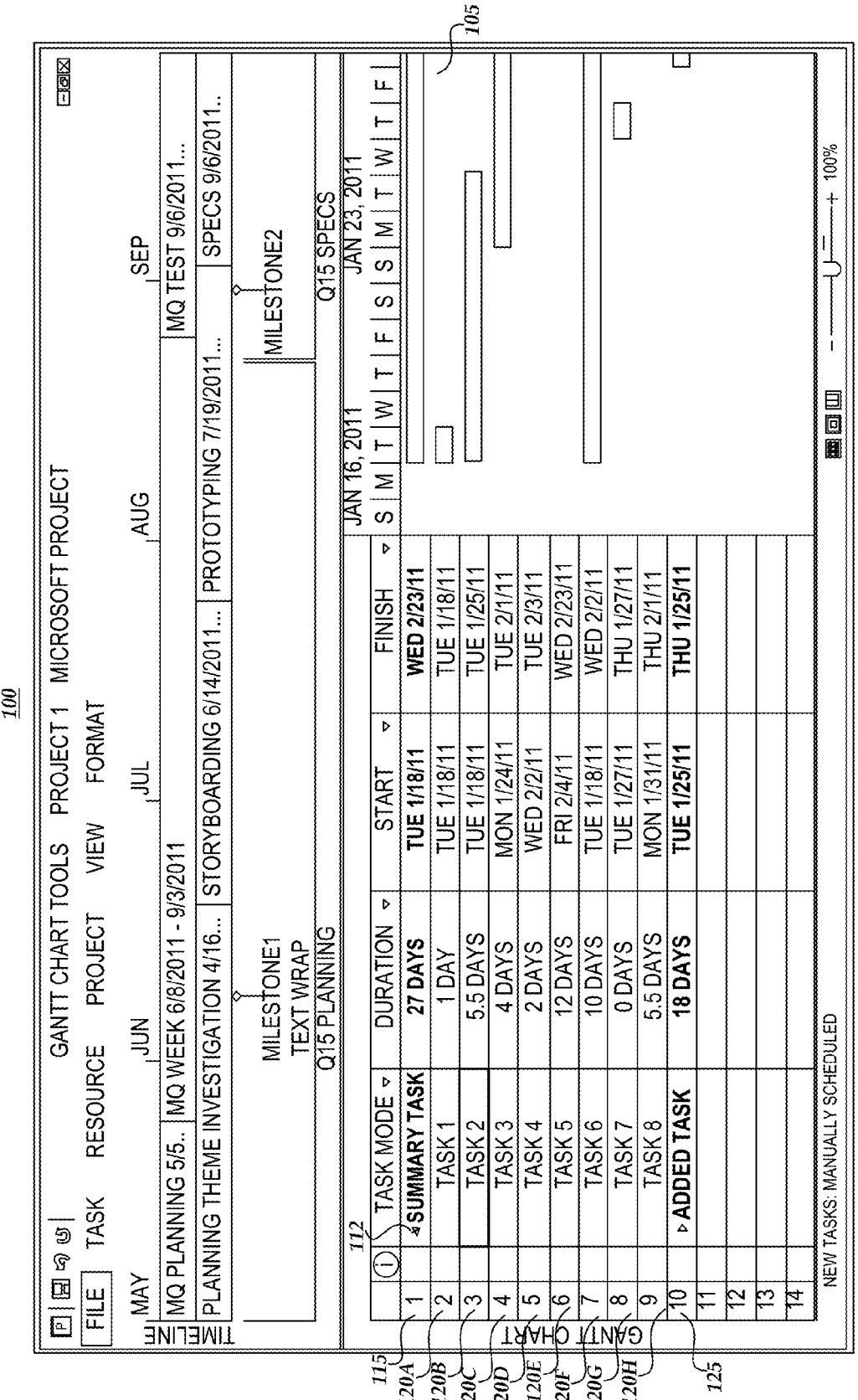
FIG. 1 is a computer screen display of a user interface showing content prior to being collapsed or after being expanded, in accordance with an embodiment.

FIG. 1 is a computer screen display of a user interface 100 showing content prior to being collapsed or after being expanded, in accordance with an embodiment. The user interface 100 may be generated by an application (e.g., a project management application) executing on a computing device utilized in the creation and editing of electronic documents. The user interface 100 may include a content surface 105 for displaying task data in rows 115, 120A-H and 125. In particular, the row 115 may display a summary of individual task data items displayed in rows 120A-120H. The row 125 shows an added task data for a different task on the content surface 105. The user interface may further include a user control 112 (i.e., an arrow) which is shown pointing in a downward direction toward the task data items in the rows 120A-120H. In accordance with an embodiment, the user control 112 may be utilized for providing user feedback during the expansion or collapse of the content (i.e., the task data items) displayed in rows 120A-120H. In particular, and as will be described in greater detail herein, the user control 112 may be coordinated with the expansion and collapse of the rows 120A-120H such that the arrow may rotate to the left as content is collapsed and rotate to the right as content is expanded.

Figure 2:
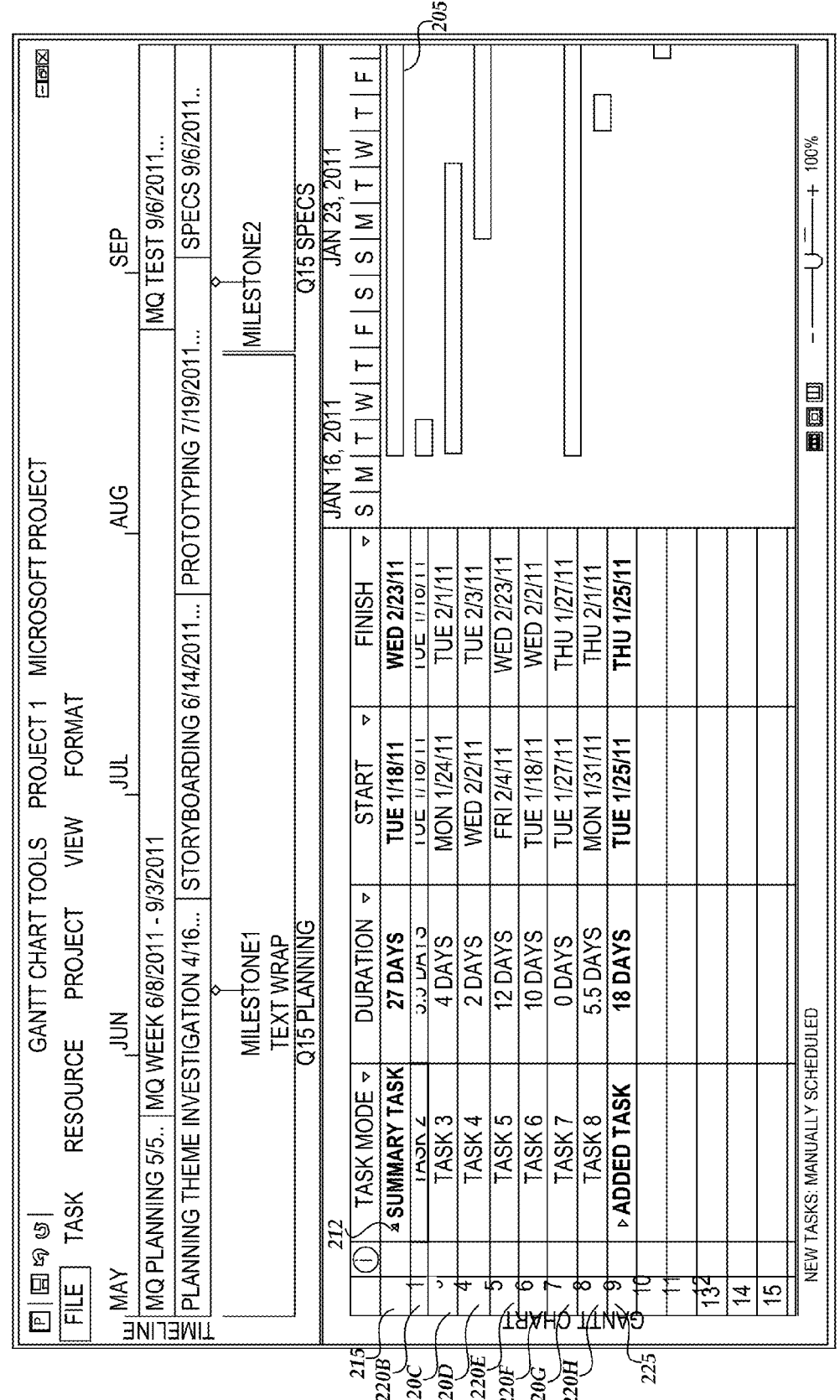
FIG. 2 is a computer screen display of a user interface showing an intermediate stage of an animation of expanding/collapsing content, in accordance with an embodiment.

FIG. 2 is a computer screen display of a user interface 200 showing an intermediate stage of an animation of expanding/collapsing content, in accordance with an embodiment. The user interface 200 may include a content surface 205 for displaying task data in rows 215, 220B-H and 225 which correspond to the rows 115, 120B-H and 125 shown in FIG. 1. It should be appreciated that user interface 200 may also comprise a hidden row corresponding to the row 120A in FIG. 1 which has previously been collapsed into the row 215 during a prior stage of the animation discussed herein. In accordance with an embodiment, the user interface 200 shows a stage of animation in which task data items displayed in the rows 220B-220H are in the process of being collapsed into the row 215 (i.e., the summary task row). In accordance with an embodiment, the collapse of the task data items may be animated by displaying a gradual upward migration of the rows 220B-220H disappearing into the row 215 (i.e., the top data row). The user interface 200 also shows a user control 212 which is in the process of rotating away from the position of the user control 112 (shown in FIG. 1) in which the user control 112 is pointing toward the task data items in the rows below the summary task. In accordance with another embodiment, the user interface 200 may also show a stage of animation in which the task data items displayed in the rows 220B-220H are in the process of being expanded out of the row 215 (i.e., the summary task row). It should be appreciated, that in accordance with this embodiment, the expansion of the task data items may be animated by displaying a gradual downward migration of the rows 220B-220H out of the row 215 (i.e., the top data row). It should further be appreciated that, in accordance with this embodiment, the user control 212 may be in the process of rotating towards the position of the user control 112 (shown in FIG. 1) in which the user control 112 is pointing toward the task data items in the rows below the summary task.

Figure 3:
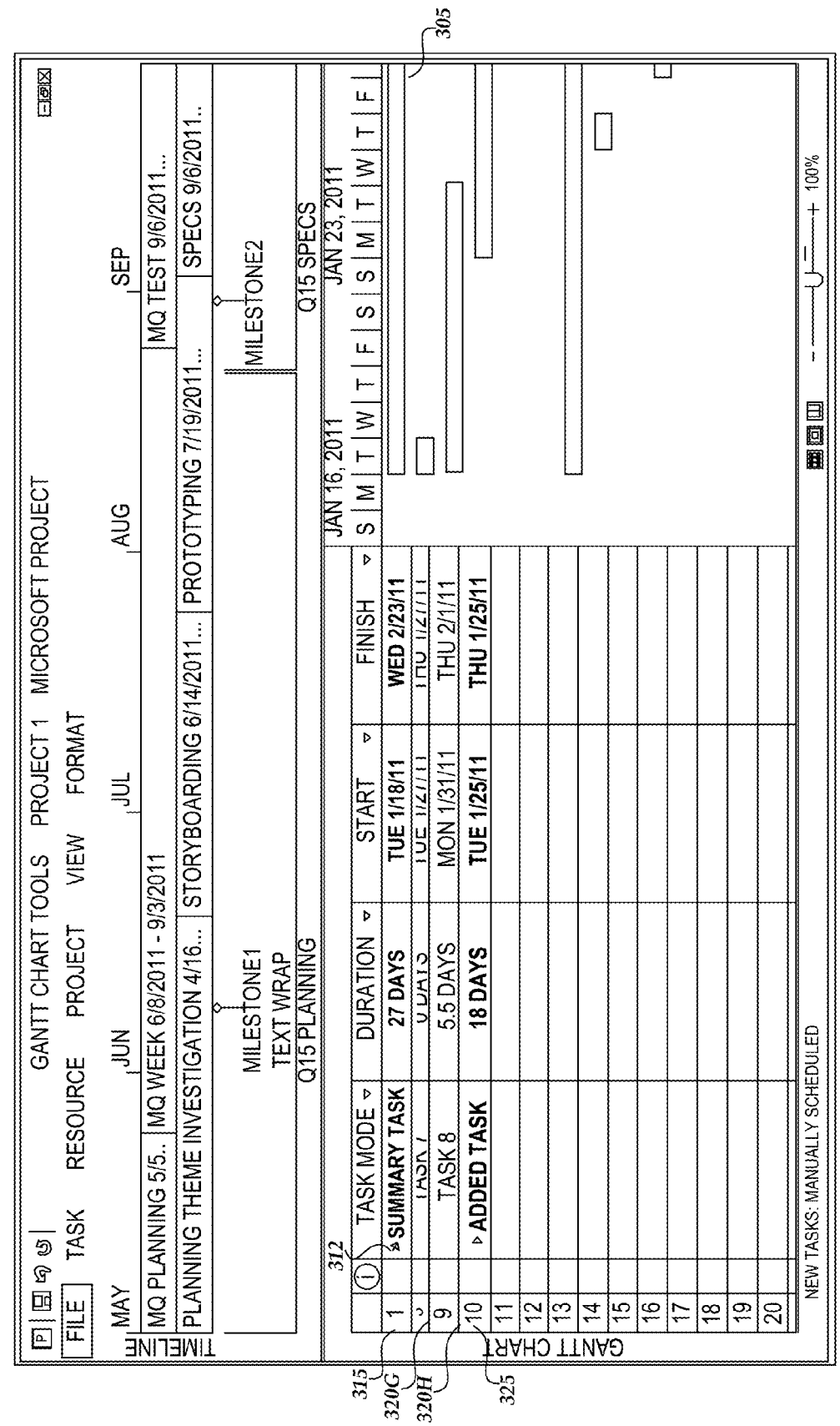
FIG. 3 is a computer screen display of a user interface showing an intermediate stage of an animation of expanding/collapsing content, in accordance with an embodiment.

FIG. 3 is a computer screen display of a user interface 300 showing an intermediate stage of an animation of expanding/collapsing content, in accordance with an embodiment. The user interface 300 may include a content surface 305 for displaying task data in rows 315, 320G-H and 325 which correspond to the rows 115, 120G-H and 125 shown in FIG. 1. It should be appreciated that user interface 300 may also comprise several hidden rows corresponding to the rows 120A-120F in FIG. 1 which have previously been collapsed into the row 315 during prior stages of the animation discussed herein. In accordance with an embodiment, the user interface 300 shows a stage of animation in which task data items displayed in the rows 320G-320H are in the process of being collapsed into the row 315 (i.e., the summary task row). In accordance with an embodiment, the collapse of the task data items may be animated by displaying a gradual upward migration of the rows 320G-320H disappearing into the row 315 (i.e., the top data row). The user interface 300 also shows a user control 312 which is in the process of rotating away from the position of the user control 212 (shown in FIG. 2). That is, the user control 312 is shown pointing in more of a horizontal direction than the user control 212. In accordance with another embodiment, the user interface 300 may also show a stage of animation in which the task data items displayed in the rows 320G-320H are in the process of being expanded out of the row 315 (i.e., the summary task row). It should be appreciated that, in accordance with this embodiment, the expansion of the task data items may be animated by displaying a gradual downward migration of the rows 320G-320H out of the row 315 (i.e., the top data row). It should further be appreciated that, in accordance with this embodiment, the user control 312 may be in the process of rotating towards the position of the user control 212 (shown in FIG. 2).

Figure 4:
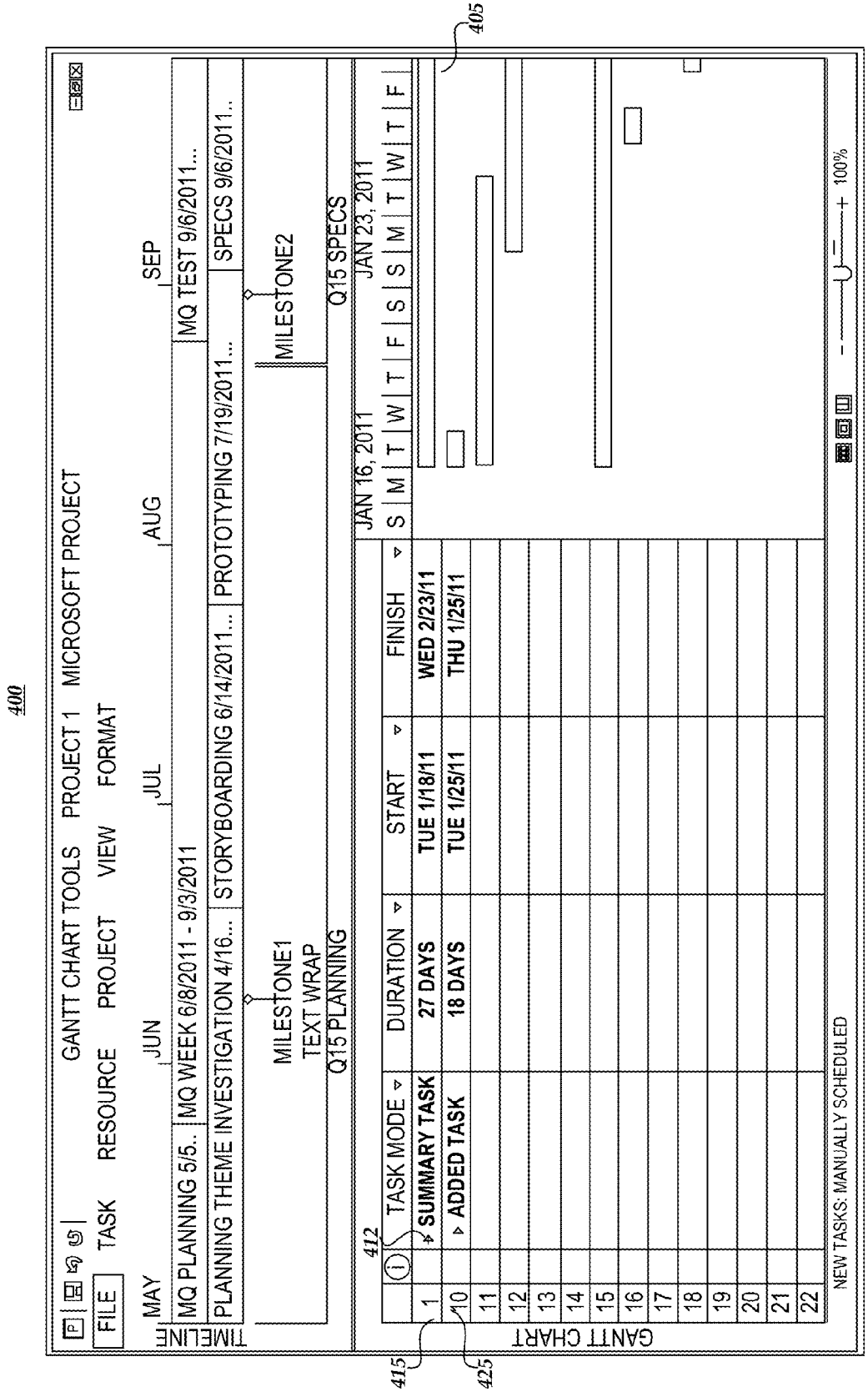
FIG. 4 is a computer screen display of a user interface showing content after being expanded or prior to being collapsed, in accordance with an embodiment.

FIG. 4 is a computer screen display of a user interface 400 showing content prior to being expanded or after being collapsed, in accordance with an embodiment. The user interface 400 may include a content surface 405 for displaying task data in rows 415 and 425 which correspond to the rows 415 and 425 shown in FIG. 1. It should be appreciated that user interface 400 may also comprise several hidden rows corresponding to the rows 120A-120H in FIG. 1 which have previously been collapsed into the row 415 during prior stages of the animation discussed herein. In accordance with an embodiment, the user interface 400 shows a stage of animation in which all of the rows between the rows 415 and 425 (i.e., the hidden rows corresponding to the rows 120A-120H in FIG. 1) have been collapsed into the row 415 (i.e., the summary task row). The user interface 400 also shows a user control 412 which has rotated so that it is now pointing in a completely horizontal direction. In accordance with another embodiment, the user interface 400 may also show an initial state of the content surface 405 prior to initiating the expansion of task data items (i.e., the hidden rows corresponding to the rows 120A-120H in FIG. 1) out of the row 415 (i.e., the summary task row).

Figure 5:
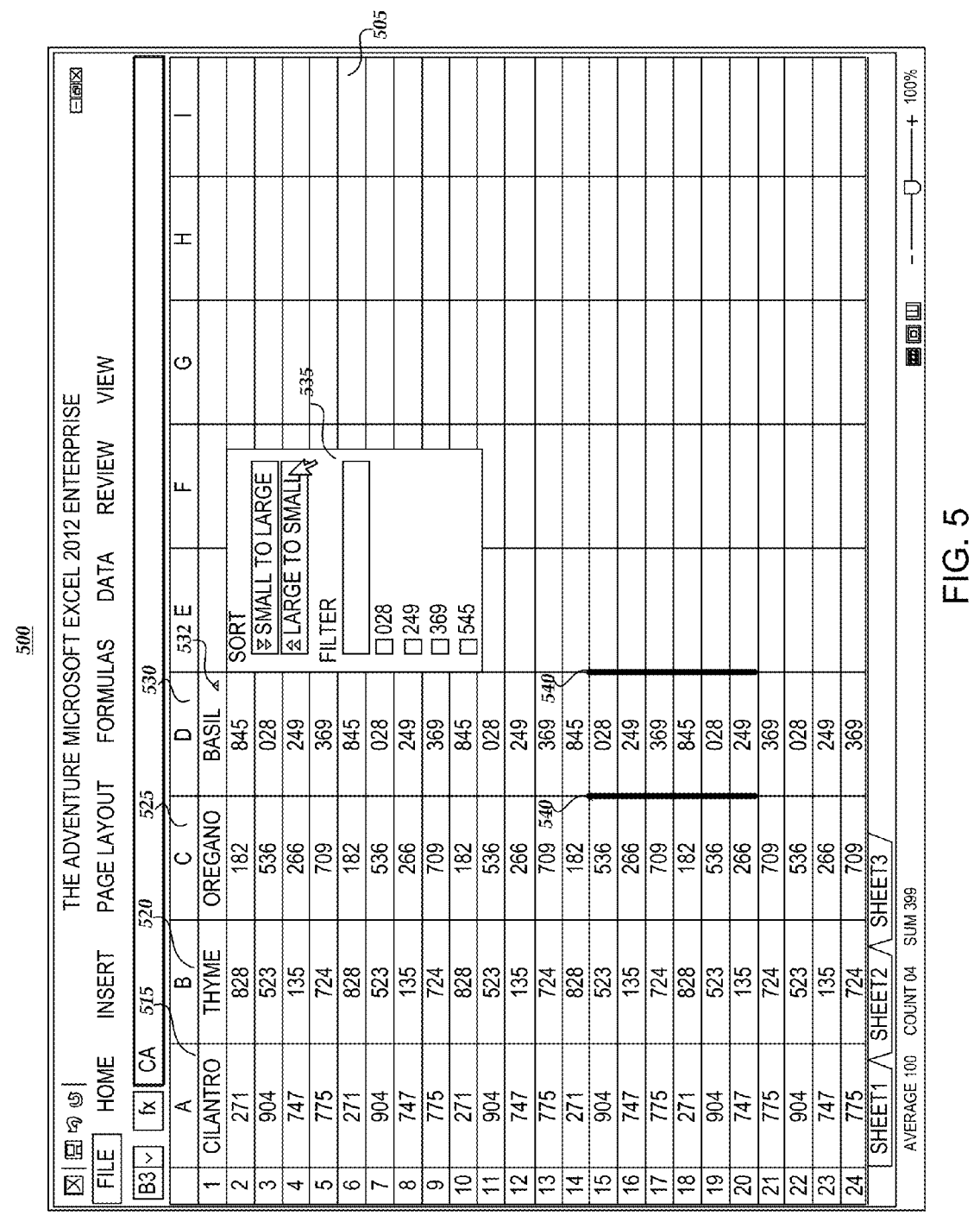

FIG. 5 is a computer screen display of a user interface 500 showing an initial stage of an animation of content being sorted, in accordance with an embodiment. The user interface 500 may be generated by an application (e.g., a spreadsheet application) executing on a computing device utilized in the creation and editing of electronic documents such as spreadsheets. The user interface 500 may include a content surface 505 for displaying content (i.e., data) in columns 515, 520, 525 and 530. The user interface 500 further comprises a user sort control 535 for data sorting. The user sort control 535 may allow a user to sort selected content within one or more of the columns 515, 520, 525 and 530 in either an ascending order (i.e., small-to-large) or a descending order (i.e., large-to-small). The user sort control 535 may also include directional arrows indicating the direction in which data will be sorted during animation. For example, the large-to-small sort option in the user sort control 535 is shown with arrows pointing upward to indicate that selected data will be sorted in an upward direction. The user interface 500 may further include a user control 532 which may be an arrow which identifies a currently selected data column (i.e., the column 530) to be sorted on the content surface 505. The user interface 500 further shows sort guides 540 which may be generated by the application upon the selection of a sorting operation in the user control 535. In accordance with an embodiment, the sort guides 540 may comprise colored lines (to facilitate identification by a user) that appear at an initial stage of animating a sort of content on the content surface 505. As will be discussed in greater detail herein, the sort guides 540 may travel along the right and left edges of the column being sorted and in the direction of the sort.

Figure 6:
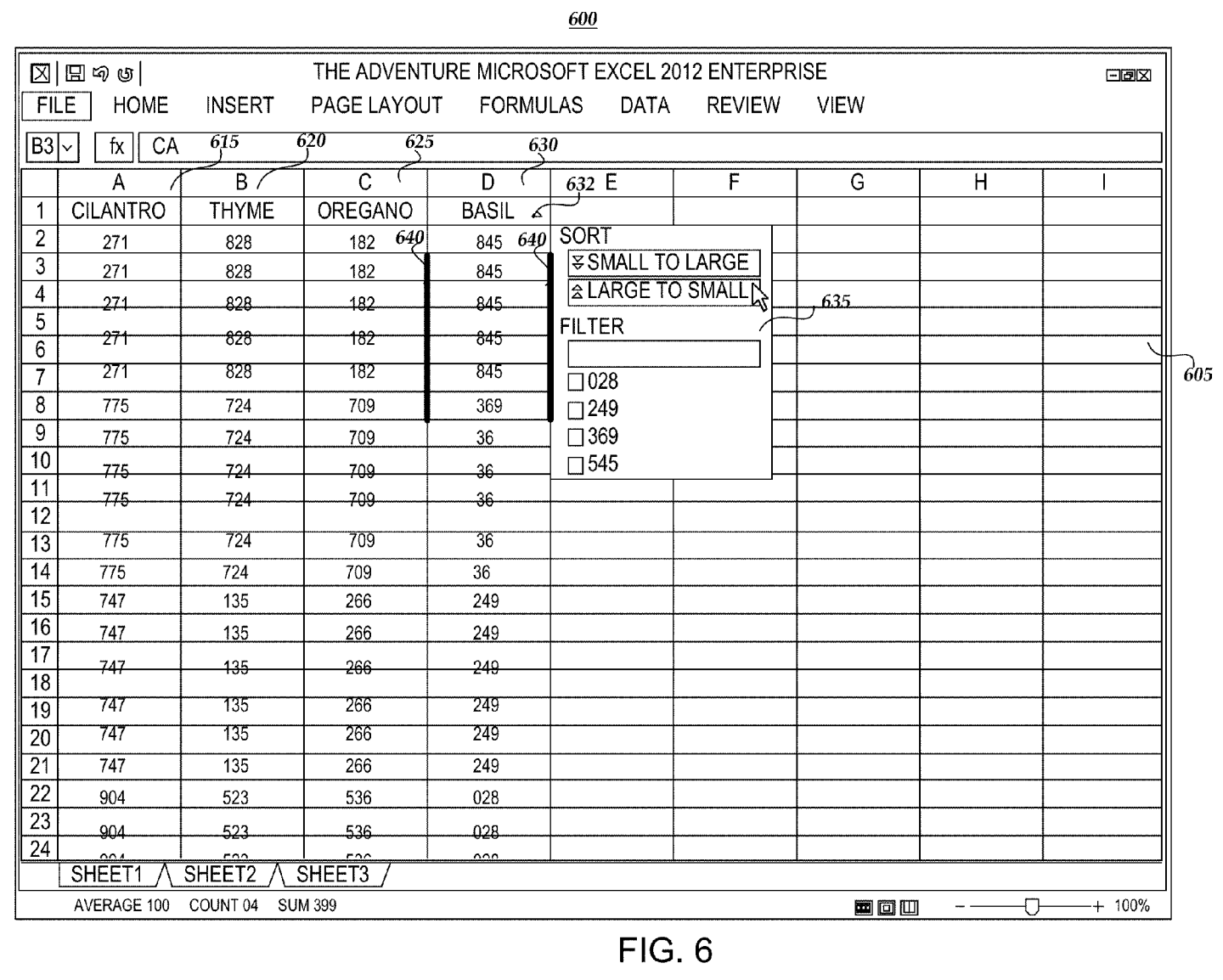

FIG. 6 is a computer screen display of a user interface 600 showing an intermediate stage of an animation of content being sorted, in accordance with an embodiment. The user interface 600 may be generated by an application (e.g., a spreadsheet application) executing on a computing device utilized in the creation and editing of electronic documents such as spreadsheets. The user interface 600 may include a content surface 605 for displaying content (i.e., data) in columns 615, 620, 625 and 630. The user interface 600 further comprises a user sort control 635 for data sorting and a user control 632 which identifies a currently selected data column (i.e., the column 630) which is being sorted on the content surface 605. FIG. 6 shows data values in the columns 615, 620, 625 and 630 being animated during a descending order (i.e., large-to-small) sort of column 630 on the content surface 605. In particular, the cell rows on the content surface 605 containing the larger data values (i.e., the values "845") in the column 630 are being moved toward the top of the content surface 605. In addition, sort guides 640 on either side of the column 630 are displayed as traveling from the bottom of the content surface 605 to the top of the content surface 605 in the direction of the sort.

FIG. 7 is a computer screen display of a user interface 700 showing a final stage of an animation of content being sorted, in accordance with an embodiment. The user interface 700 may be generated by an application (e.g., a spreadsheet application) executing on a computing device utilized in the creation and editing of electronic documents such as spreadsheets. The user interface 700 may include a content surface 705 for displaying content (i.e., data) in columns 715, 720, 725 and 730. The user interface 700 further comprises a user sort control 735 for data sorting and a user control 732 which identifies a currently selected data column (i.e., the column 730) for which a sort has been completed on the content surface 705. It should be appreciated that, as a result of the animation discussed above with respect to FIGS. 5-6, the content in the column 730 is sorted in a descending (i.e., large-to-small) order while the content in columns 715, 720 and 725 is unsorted. It should also be appreciated that the sort guides 540 and 640 shown in FIGS. 5 and 6 are not shown in FIG. 7 as the sorting operation has been completed.

Figure 8:
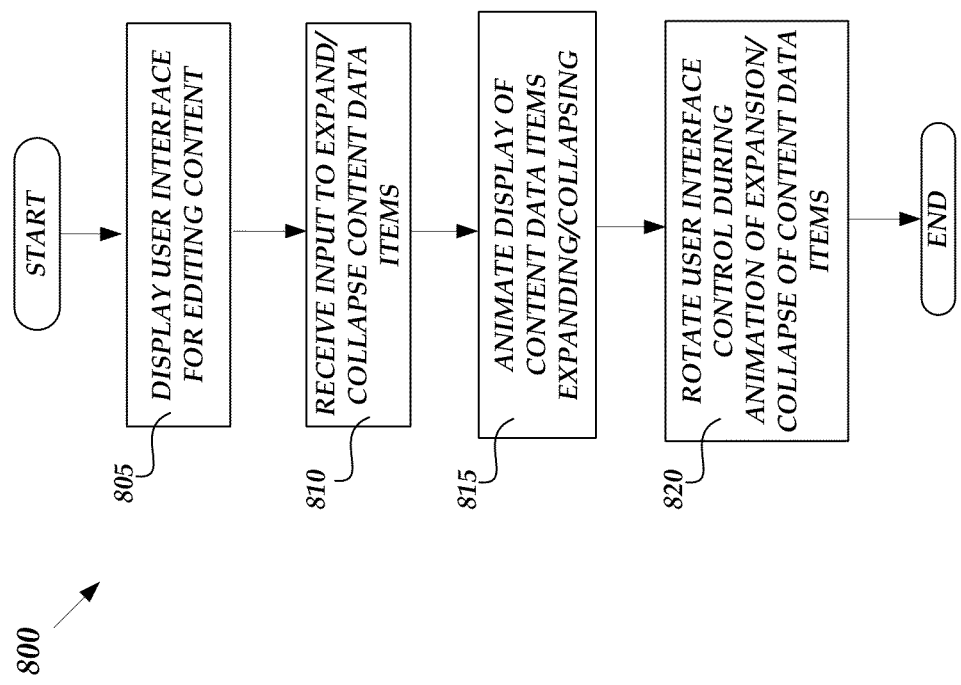
FIG. 8 is a flow diagram illustrating a routine for animating the expansion and collapse of content, in accordance with an embodiment.

FIG. 8 is a flow diagram illustrating a routine 800 for animating the expansion and collapse of content, in accordance with an embodiment. When reading the discussion of the routine presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 8-9 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 800 begins at operation 805, where a computing device may be utilized to execute an application for displaying a user interface comprising a content surface for editing content. The content surface may display content comprising multiple rows of data including a top data row and one or more data items in a row or rows below the top data row. In accordance with an embodiment (as shown in FIG. 1), the application may comprise a project management application and the content surface may be a project application project sheet. In accordance with an embodiment (as shown in FIG. 1), the content may include a group of adjacent rows and columns describing various tasks for a project. For example, the content may include summary task data displayed as the top data row and one or more task data items displayed in a row or rows below the top data row.

From operation 805, the routine 800 continues to operation 810, where the application executing on the computing device may receive a user interface input for initiating the expansion/collapse of the data items on the content surface. In accordance with an embodiment, the user interface input may be a user selection of a user control displayed on the content surface (such as the user control 112 in FIG. 1).

From operation 810, the routine 800 continues to operation 815, where the application executing on the computing device may animate a display of the data items expanding out of the top data row on the content surface or alternatively collapsing into the top data row on the content surface. In accordance with an embodiment, the animation of the expansion of the data items may include displaying a gradual downward migration of the data items out of the top data row until all of the data items are visible on the content surface. For example (as shown in FIG. 2), the expansion animation may include a display of adjacent rows and columns of project task expanding together out of the top data row on the content surface. In accordance with an embodiment, the animation of the collapse of the data items may include displaying a gradual upward migration of the data items into the top data row until all of the data items are hidden from view on the content surface. For example (as shown in FIG. 3), the collapse animation may include displaying adjacent rows and columns of project task data collapsing together into the top data row on the content surface.

From operation 815, the routine 800 continues to operation 820, where the application executing on the computing device may rotate a user interface control (such as the user control 112 shown in FIG. 1) during the animation of the expansion/collapse of the data items discussed above at operation 815. In particular, the user interface control, which may be displayed adjacent to the top data row on the content surface, may be displayed as rotating in a first direction upon the expansion of the data items out of the top data row on the content surface and rotating in a second (i.e., opposite) direction upon the collapse of the data items into the top data row on the content surface. For example, as discussed above, FIGS. 1-4 show a user control which rotates as content expanded/collapsed on a content surface. It should be appreciated that the rotation of the user control during the animation of expanding/collapsing content discussed herein may be coordinated with the expansion and collapse of the content and provides the user with additional visual feedback. From operation 820, the routine 800 then ends.

Figure 9:
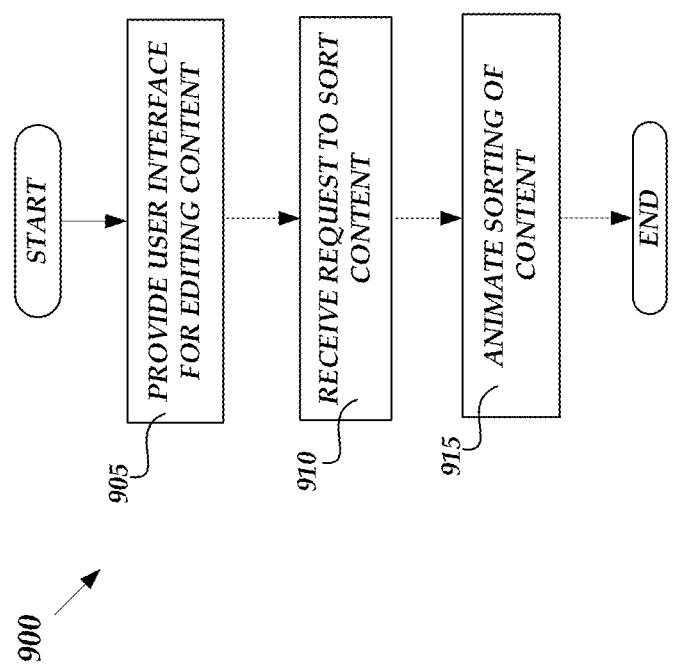
FIG. 9 is a flow diagram illustrating a routine for animating the sorting of content, in accordance with an embodiment.

FIG. 9 is a flow diagram illustrating a routine 900 for animating the sorting of content, in accordance with an embodiment. The routine 900 begins at operation 905, where a computing device may be utilized to execute an application for displaying a user interface comprising a content surface for editing content. In accordance with an embodiment (as shown in FIG. 5), the application may comprise a spreadsheet application and the content surface may be a spreadsheet. In accordance with an embodiment (as shown in FIG. 1), the content may include a group of adjacent columns of text and numerical data values.

From operation 905, the routine 900 continues to operation 910, where the application executing on the computing device may receive a request in the user interface to sort the content on the content surface. For example, as shown in FIG. 5, a user may select a sort option in a user sort control to sort data values within a selected column of data in either an ascending order (i.e., small-to-large) or a descending order (i.e., large-to-small).

From operation 910, the routine 900 continues to operation 915, where the application executing on the computing device may animate the sorting of content on the content surface. In accordance with an embodiment, the animation may include displaying a staggered transition of selected data values to sorted data values. For example, FIG. 6 shows the animation of data values in column 730 during an illustrative descending order sort operation. In accordance with an embodiment, the animation may also include the display of sort guides (such as the sort guides 540 and 640 shown in FIGS. 5 and 6) which move along a right edge and a left edge of a column containing the content being sorted and in a direction corresponding to a direction of the sort. Thus, in a descending order sort, the sort guides would be displayed as moving in an upward direction and in an ascending order sort, the sort guides would be displayed as moving in a downward direction. In accordance with an embodiment, the animation may also include a multi-level sort of the content. It should be understood that in a multi-level sort, the animation is dependent on a first level of the multi-level sort. For example, a spreadsheet may comprise two columns of data related to dessert sales for a bakery. The columns may identify a dessert flavor and a dessert price. A user may wish to conduct a multi-level sort in which a first level (i.e., first sort) is a sort of the dessert price data from low-to-high (ascending order) and a second level (i.e., subsequent sort) is a sort the dessert flavor data. In accordance with an embodiment, the animation of multi-level sorts depends on the direction of the first level sort. Thus, in the above example, the direction of the first level sort of the dessert price data would control the direction of the second level sort of the dessert flavor column. It should be understood that, in accordance with the embodiments described herein, the animation of the sorting content may be accomplished within a fixed time period without regard to the number of rows or columns of data on the content surface. That is, during animation, each individual data value (i.e., cell value) is staggered only in starting distance but not in animation completion time. Thus, the animation may be described as a compressing animation that sorts data in a fixed amount of time. It should further be understood that all of the content being animated will transition or move in the same direction (i.e., upwards or downwards) depending on whether the sort is descending or ascending. It should be appreciated that the animation of the sorting of content described herein may facilitate showing to a user that content has been sorted and the direction of the sort. From operation 915, the routine 900 then ends.

Figure 10:
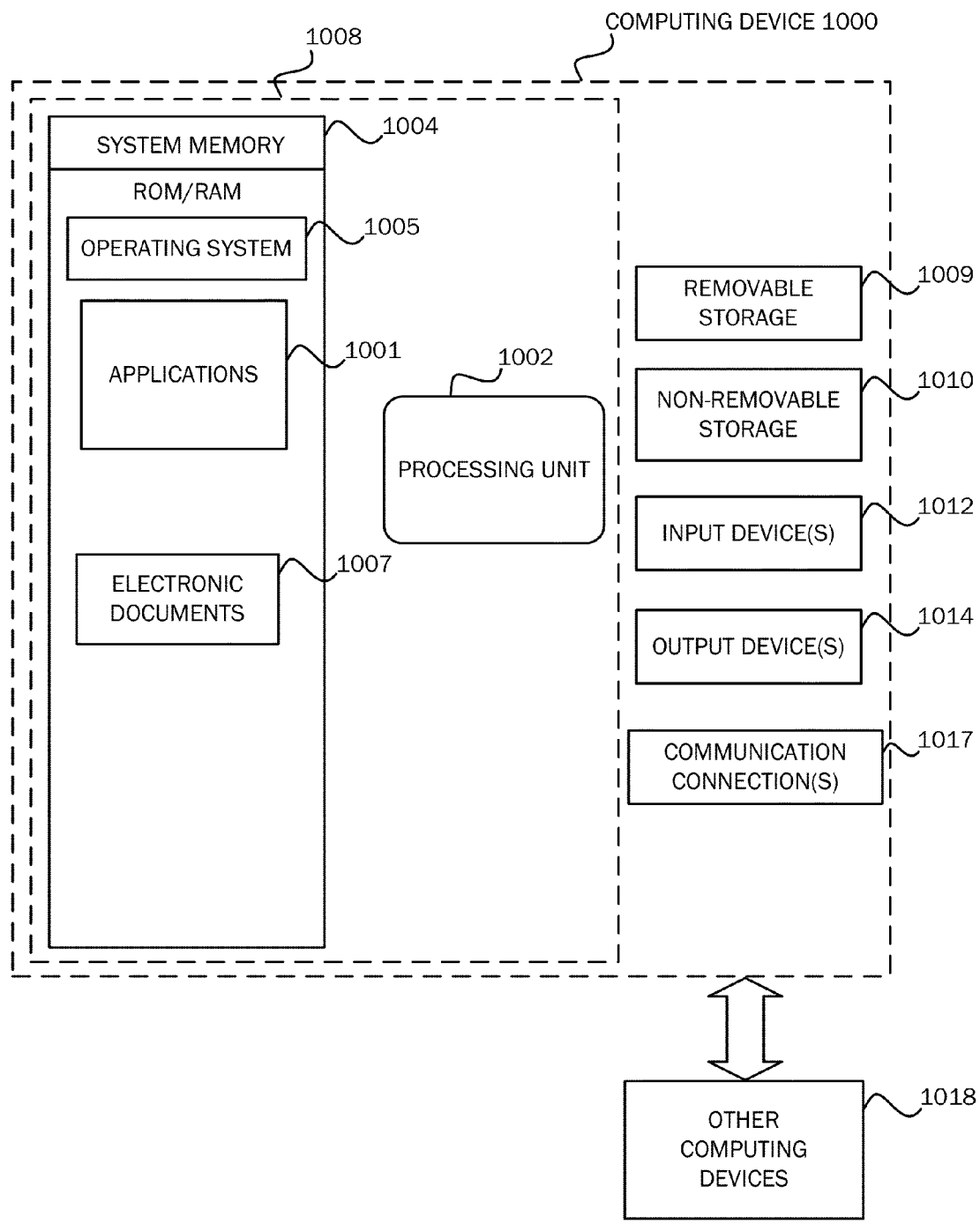
FIG. 10 is a simplified block diagram of a computing device with which various embodiments may be practiced.

FIG. 10 is a block diagram illustrating example physical components of a computing device 1000 with which various embodiments may be practiced. The computing device components described below may be suitable for the computing device described above with respect to FIGS. 1-9. In a basic configuration, the computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include an operating system 1005, application 1001 and electronic documents 1007. Operating system 1005, for example, may be suitable for controlling computing device 1000's operation and, in accordance with an embodiment, may comprise the WINDOWS operating systems from MICROSOFT CORPORATION of Redmond, Wash. The applications 1001 may comprise the WORD word processing software, POWERPOINT presentation graphics software, EXCEL spreadsheet software, VISIO diagramming software, PROJECT project management software, PUBLISHER publishing software, OUTLOOK personal information management software and the ONENOTE note-taking software from MICROSOFT CORPORATION of Redmond Wash. It should be appreciated that the aforementioned productivity applications 1001 may be optionally incorporated into a suite of productivity applications such as the OFFICE application program suite from MICROSOFT CORPORATION. It should be understood, however, that other applications from other manufacturers may be utilized in accordance with the various embodiments described herein. In accordance with an embodiment, the electronic documents 1007 may comprise documents generated by or displayed in a user interface generated by the applications 1001. For example, in accordance with various embodiments, the electronic documents 1007 may include, without limitation, word processing documents, presentation documents, spreadsheet documents, diagramming documents, project management documents, publishing documents, personal information management documents and note-taking documents. It should be understood that the embodiments described herein may also be practiced in conjunction with other operating systems and application programs and further, is not limited to any particular application or system.

The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010.

While executing on the processing unit 1002 of the computing device 1000, the spreadsheet applications 1001 may perform routines for animating the expansion and collapse of content and animating the sorting of content including, for example, one or more of the operations in routines 800 and 900 described above. The aforementioned routines are examples, and the processing unit 1002 may perform other routines. Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the spreadsheet application 1001 may operate via application-specific logic integrated with other components of the computing device/system 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Various embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 1000. Any such computer storage media may be part of the computing device 1000. The computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
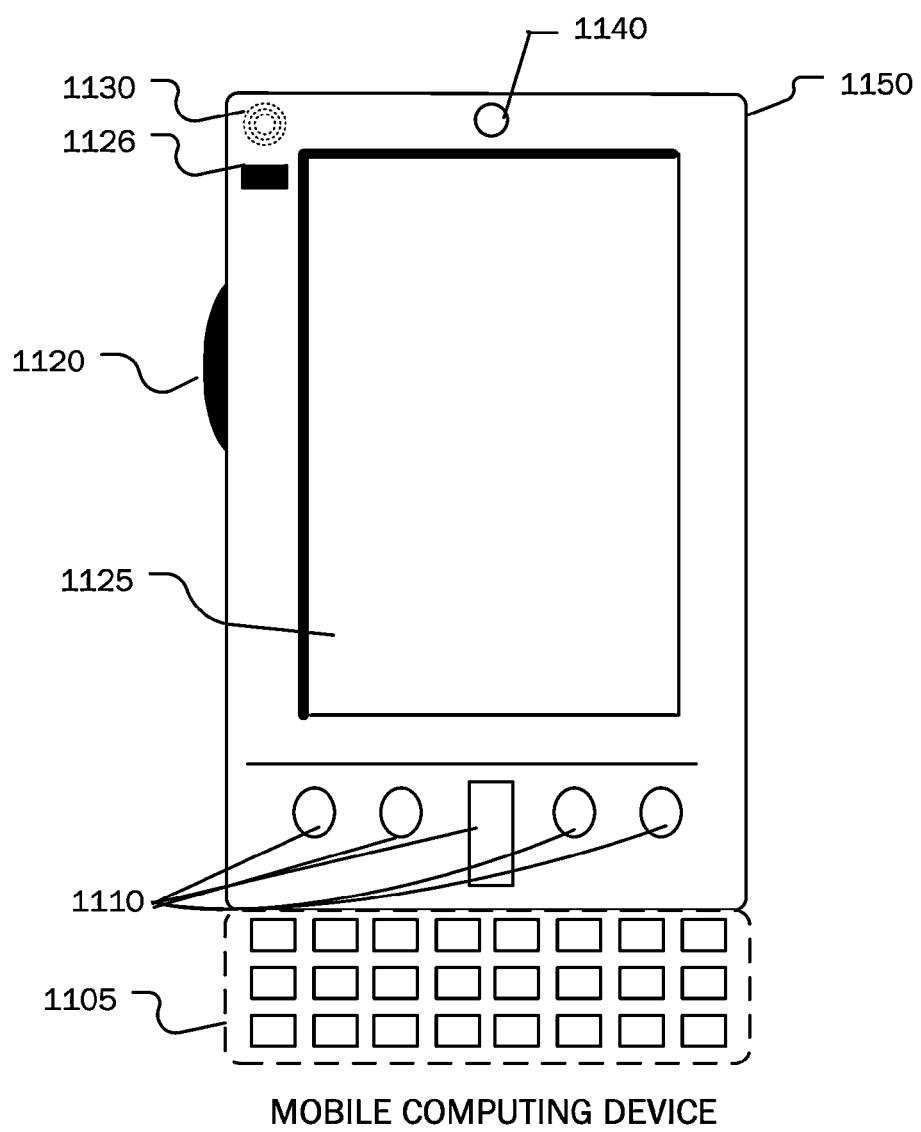
FIG. 11A is a simplified block diagram of a mobile computing device with which various embodiments may be practiced.
Figure 11B:
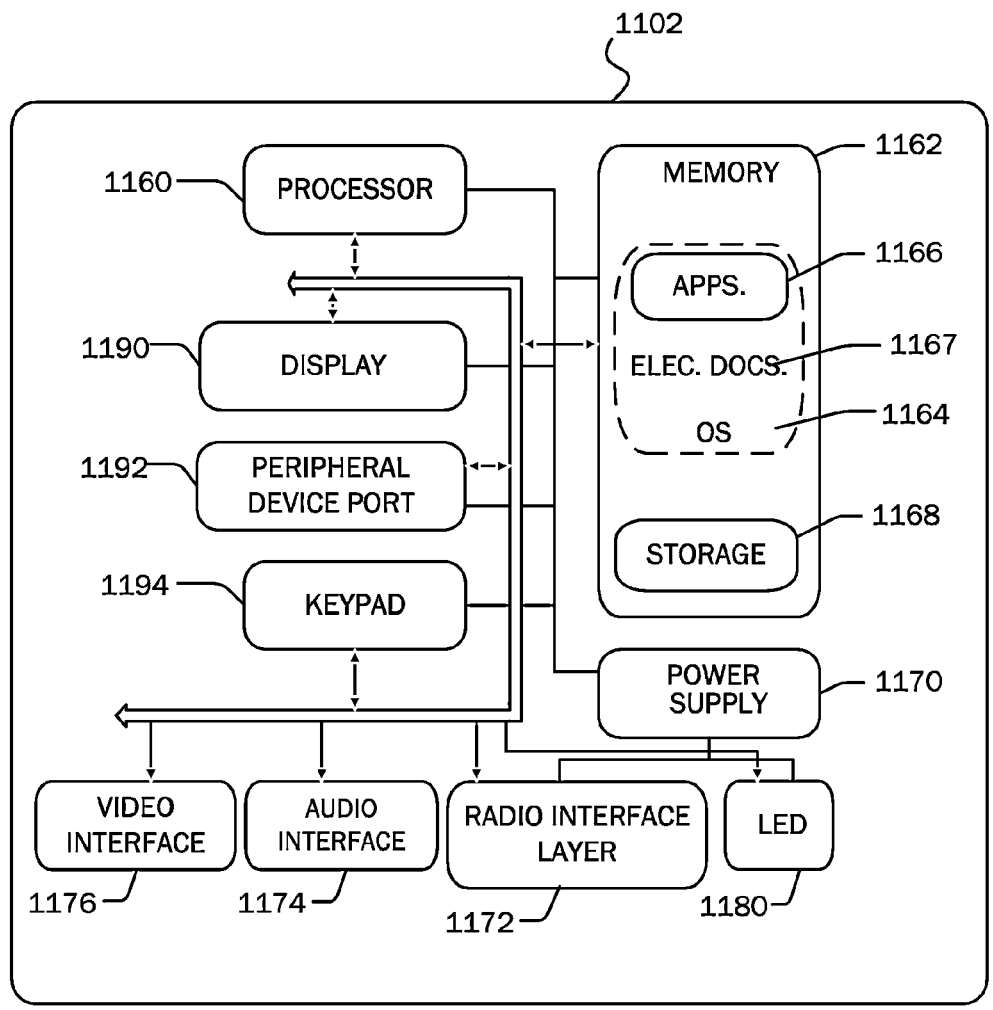
FIG. 11B is a simplified block diagram of a mobile computing device with which various embodiments may be practiced.

FIGS. 11A and 11B illustrate a suitable mobile computing environment, for example, a mobile computing device 1150, a smartphone, a tablet personal computer, a laptop computer, and the like, with which various embodiments may be practiced. With reference to FIG. 11A, an example mobile computing device 1150 for implementing the embodiments is illustrated. In a basic configuration, mobile computing device 1150 is a handheld computer having both input elements and output elements. Input elements may include touch screen display 1125 and input buttons 1110 that allow the user to enter information into mobile computing device 1150. Mobile computing device 1150 may also incorporate an optional side input element 1120 allowing further user input. Optional side input element 1120 may be a rotary switch, a button, or any other type of manual input element. In alternative embodiments, mobile computing device 1150 may incorporate more or less input elements. For example, display 1125 may not be a touch screen in some embodiments. In yet another alternative embodiment, the mobile computing device is a portable phone system, such as a cellular phone having display 1125 and input buttons 1110. Mobile computing device 1150 may also include an optional keypad 1105. Optional keypad 1105 may be a physical keypad or a "soft" keypad generated on the touch screen display.

Mobile computing device 1150 incorporates output elements, such as display 1125, which can display a graphical user interface (GUI). Other output elements include speaker 1130 and LED light 1126. Additionally, mobile computing device 1150 may incorporate a vibration module (not shown), which causes mobile computing device 1150 to vibrate to notify the user of an event. In yet another embodiment, mobile computing device 1150 may incorporate a headphone jack (not shown) for providing another means of providing output signals.

Although described herein in combination with mobile computing device 1150, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 11B is a block diagram illustrating components of a mobile computing device used in one embodiment, such as the computing device shown in FIG. 11A. That is, mobile computing device 1150 can incorporate a system 1102 to implement some embodiments. For example, system 1102 can be used in implementing a "smart phone" that can run one or more applications similar to those of a desktop or notebook computer such as, for example, the applications discussed above with respect to FIGS. 1-10 as well as other applications. In some embodiments, the system 1102 is integrated as a computing device, such as an integrated personal digital assistant (PDA) and wireless phone.

The applications 1166 may be loaded into memory 1162 and run on or in association with an operating system 1164. The applications 1166 may perform routines for animating the expansion and collapse of content and animating the sorting of content including, for example, one or more of the operations in routines 800 and 900 described above. The memory 1162 may also include one or more electronic documents 1167 which may be generated by the applications 1166. The system 1102 also includes non-volatile storage 1168 within memory the 1162. Non-volatile storage 1168 may be used to store persistent information that should not be lost if system 1102 is powered down. The spreadsheet application 1166 may use and store information in the non-volatile storage 1168. A synchronization application (not shown) also resides on system 1102 and is programmed to interact with a corresponding synchronization application resident on a host computer to keep the information stored in the non-volatile storage 1168 synchronized with corresponding information stored at the host computer. As should be appreciated, other applications may also be loaded into the memory 1162 and run on the device 1150.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio 1172 that performs the function of transmitting and receiving radio frequency communications. The radio 1172 facilitates wireless connectivity between the system 1102 and the "outside world," via a communications carrier or service provider. Transmissions to and from the radio 1172 are conducted under control of OS 1164. In other words, communications received by the radio 1172 may be disseminated to the spreadsheet application 1166 via OS 1164, and vice versa.

The radio 1172 allows the system 1102 to communicate with other computing devices, such as over a network. The radio 1172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The embodiment of the system 1102 is shown with two types of notification output devices; an LED 1180 that can be used to provide visual notifications and an audio interface 1174 that can be used with speaker 1130 to provide audio notifications. These devices may be directly coupled to the power supply 1170 so that when activated, they remain on for a duration dictated by the notification mechanism even though processor 1160 and other components might shut down for conserving battery power. The LED 1180 may be programmed to remain on indefinitely until the user takes action to indicate the powered-on status of the device. The audio interface 1174 is used to provide audible signals to and receive audible signals from the user. For example, in addition to being coupled to speaker 1130, the audio interface 1174 may also be coupled to a microphone (not shown) to receive audible input, such as to facilitate a telephone conversation. In accordance with embodiments of the present invention, the microphone may also serve as an audio sensor to facilitate control of notifications. The system 1102 may further include a video interface 1176 that enables an operation of on-board camera 1140 to record still images, video stream, and the like.

A mobile computing device implementing the system 1102 may have additional features or functionality. For example, the device may also include additional data storage devices (removable and/or non-removable) such as, magnetic disks, optical disks, or tape. Such additional storage is illustrated in FIG. 11B by storage 1168. Computer storage media may include volatile and nonvolatile, removable and non-removable media implemented in any method or technology for storage of information, such as computer readable instructions, data structures, program modules, or other data.

Data/information generated or captured by the device 1150 and stored via the system 1102 may be stored locally on the device 1150, as described above, or the data may be stored on any number of storage media that may be accessed by the device via the radio 1172 or via a wired connection between the device 1150 and a separate computing device associated with the device 1150, for example, a server computer in a distributed computing network such as the Internet. As should be appreciated such data/information may be accessed via the device 1150 via the radio 1172 or via a distributed computing network. Similarly, such data/information may be readily transferred between computing devices for storage and use according to well-known data/information transfer and storage means, including electronic mail and collaborative data/information sharing systems.

Figure 12:
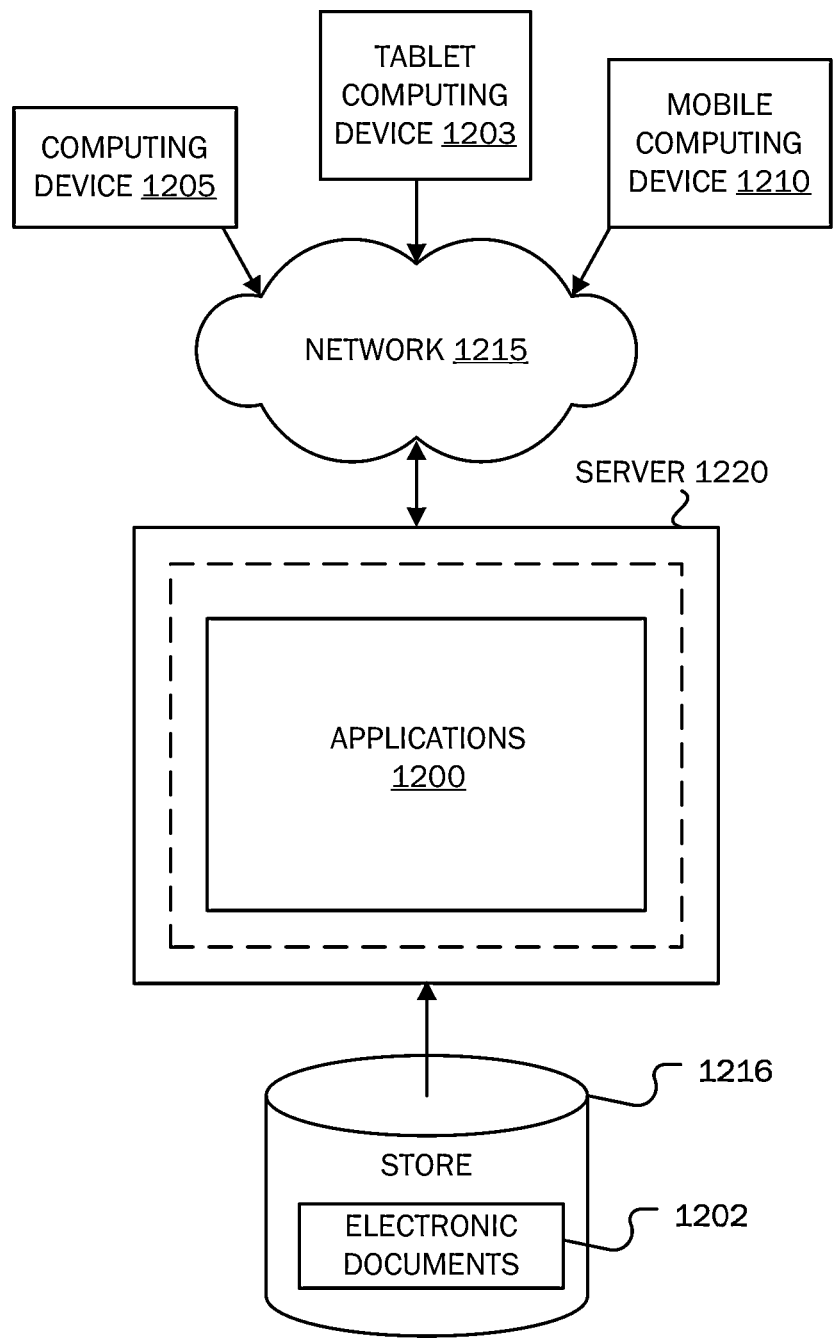
FIG. 12 is a simplified block diagram of a distributed computing system in which various embodiments may be practiced.

FIG. 12 is a simplified block diagram of a distributed computing system in which various embodiments may be practiced. The distributed computing system may include number of client devices such as a computing device 1205, a tablet computing device 1203 and a mobile computing device 1210. The client devices 1205, 1203 and 1210 may be in communication with a distributed computing network 1215 (e.g., the Internet). A server 1220 is in communication with the client devices 1205, 1203 and 1210 over the network 1215. The server 1220 may store applications 1200 which may be perform routines may perform routines for animating the expansion and collapse of content and animating the sorting of content including, for example, one or more of the operations in routines 800 and 900 described above. The applications 1200 on the server 1220 may be utilized by the client devices 1205, 1203 and 1210 (over the network 1215) to generate electronic documents 1202 and for storing same in a store 1216.

Various embodiments are described above with reference to block diagrams and/or operational illustrations of methods, systems, and computer program products according to embodiments of the invention. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the invention.

It will be apparent to those skilled in the art that various modifications or variations may be made without departing from the scope or spirit of the invention. Other embodiments will be apparent to those skilled in the art from consideration of the specification and practice of the invention disclosed herein.

What is claimed is:

1. A computer-implemented method for animating a sorting of content in an electronic document, comprising:
    displaying, by a computer, a user interface comprising a user sort control indicating a direction and a content surface for editing content;
    receiving, by the computer, an input on the user sort control to sort the content on the content surface; and
    in response to receiving the input on the user sort control, animating, by the computer, a sort of the content on the content surface, the animation comprising displaying a plurality of sort guides moving over a right edge and a left edge of a column defined by vertical lines and containing the content being sorted, the plurality of sort guides further moving in a direction corresponding to the direction indicated by the user sort control.

2. The method of claim 1, wherein receiving, by the computer, a request in the user interface to sort the content on the content surface comprises receiving a request to sort a plurality of data values in a descending order.

3. The method of claim 1, wherein receiving, by the computer, a request in the user interface to sort the content on the content surface comprises receiving a request to sort a plurality of data values in an ascending order.

4. The method of claim 1, wherein animating, by the computer, the sort of the content on the content surface comprises displaying a staggered transition of a plurality of data values to a plurality of sorted data values.

5. The method of claim 1, wherein animating, by the computer, the sort of the content on the content surface comprises animating the sort of the content in a fixed time period without regard to a number of a plurality of columns containing the content on the content surface.

6. The method of claim 1, wherein animating, by the computer, the sort of the content on the content surface comprises animating a multi-level sort of the content, wherein the animation is dependent on a first level of the multi-level sort.

7. A computer system for animating a sorting of content in a spreadsheet, comprising:
    a memory for storing executable program code; and
    a processor, functionally coupled to the memory, the processor being responsive to computer-executable instructions contained in the program code and operative to:
    display a user interface comprising a user control indicating a direction and a content surface for editing content;
    receive an input on the user sort control to sort the content on the content surface; and
    in response to the received input on the user sort control, animate a sort of the content on the content surface, the animation comprising a display of a plurality of sort guides moving over a right edge and a left edge of a column defined by vertical lines and containing the content being sorted, the plurality of sort guides further moving in a direction corresponding to the direction indicated by the user sort control.

8. The system claim 7, wherein the processor, in receiving a request in the user interface to sort the content on the content surface, is operative to receive a request to sort a plurality of data values in a descending order.

9. The system of claim 7, wherein the processor, in receiving a request in the user interface to sort the content on the content surface, is operative to receive a request to sort a plurality of data values in an ascending order.

10. The system of claim 7, wherein the processor, in animating the sort of the content on the content surface, is operative to display a staggered transition of a plurality of data values to a plurality of sorted data values.

11. The system of claim 7, wherein the processor, in animating the sort of the content on the content surface, is operative to animate the sort of the content in a fixed time period without regard to a number of a plurality of columns containing the content on the content surface.

12. A computer system for animating a sorting of content in a spreadsheet, comprising:
    a memory for storing executable program code; and
    a processor, functionally coupled to the memory, the processor being responsive to computer-executable instructions contained in the program code and operative to:
    display a user interface comprising a user control, a user sort control and a content surface comprising a plurality of data columns in the spreadsheet, the user control comprising an arrow identifying a currently selected data column comprising a plurality of data values in the spreadsheet to be sorted, the user sort control comprising a plurality of directional arrows;
    receive an input on the user sort control to sort the plurality of data values in one or more of an ascending order and a descending order;
    in response to the received input on the user sort control, animate a sort of the plurality of data values the content surface, the animation comprising:
        a display of a staggered transition of the plurality of data values to a plurality of sorted data values, the plurality of directional arrows pointing in a direction of the sort; and
        a display of a plurality of sort guides simultaneously moving over a right edge and a left edge of vertical lines defining the currently selected data column in the spreadsheet, the plurality of sort guides further moving in a direction indicated by the plurality of directional arrows, the plurality of sort guides comprising colored lines to facilitate identification by a user during the sort; and remove the display of the plurality of sort guides following completion of the sort.

13. The computer system of claim 12, wherein the processor, in animating the sort of the content on the content surface, is further operative to animate the sort of the plurality of data values in a fixed time period without regard to the plurality of data columns in the spreadsheet.

\* \* \* \* \*